United States Patent [19]

O'Lenick, Jr.

[11] Patent Number: 5,070,171

[45] Date of Patent: Dec. 3, 1991

[54] PHOSPHATED SILICONE POLYMERS

[75] Inventor: Anthony J. O'Lenick, Jr., Lilburn, Ga.

[73] Assignee: Siltech Inc., Norcross, Ga.

[21] Appl. No.: 546,358

[22] Filed: Jun. 27, 1990

[51] Int. Cl.$^5$ .............................................. C08G 77/04
[52] U.S. Cl. .................................... 528/33; 525/474; 556/450
[58] Field of Search .......................... 528/33; 525/474; 556/450

[56] References Cited

U.S. PATENT DOCUMENTS 4,014,825  3/1977  Kanner .................................. 528/28
4,960,845  10/1990  O'Lenick ............................. 556/450

Primary Examiner—Melvyn I. Marquis

[57] ABSTRACT

The invention relates to a series of novel organofunctional silicone polymers which have an phosphate pendant functionality present within the polymer. Compounds of the invention by virtue of their phosphate group, provide a nonvolatile lubricant, antistat which can be applied to a variety of fibers. The compounds of the invention deposit on the fiber surface thereby altering the surface's physical properties.

The compounds of the present invention are prepared by phosphation of a hydroxyl group on the silicone polymer. The compounds useful as raw materials are dimethicone copolyols. The introduction of a phosphate group onto the silicone polymer is achieved by reaction of the hydroxyl group on the silicone with a suitable phosphating reagent. Another method of introducing the phosphate group is by the phosphation of the hydroxy containing vinyl intermediate which is subsequently reacted with the silicone polymer by hydrosilation.

19 Claims, No Drawings

5,070,171

PHOSPHATED SILICONE POLYMERS

BACKGROUND OF THE INVENTION:

(1) Field of Invention

The present invention relates to a series of novel phosphated silicone polymers which are substantive to fiber and provide antistatic properties to various fibers. The compounds, because they containg a pendant ionizable phosphate group provide the desired antistatic and lubrication properties to the fiber. Since the compounds of the present invention are high molecular weight silicone polymers, they have a high degree of oxidative stability, even at elevated temperatures. In addition, these compounds are non volatile. These combination of properties makes these polymers ideally suited for use as fiber lubricants/antistats. The compounds of the present invention are also stable to alkaline solutions, unlike the hydroxy containing silicone polymers from which they are made.

The compounds of the present invention are prepared by the phosphation of a pendant hydroxyl group which is present on a silicone polymer. In a preferred embodiment the hydroxy containing silicone polymer has been alkoxylated with ethylene oxide, propylene oxide, butylene oxide or mixtures thereof. The ability regulate the type of alkylene oxide and amount present in the silicone polymer results in a series of products ranging in water/oil solubility. The technology used to produce the compounds of the present invention is very flexible and allows us to prepare performance tailored molecules for specific applications.

(2) Object of the Invention

It is the object of the present invention to provide a series of novel phosphated silicone polymers, which are substantive to the surface of a fibers. This substantivity results in antistatic properties and lubricity. The superior antistatic properties of the compounds of the present invention are an important benefit, since this is a major aspect of fiber lubrication.

It is another objective of the current invention to provide phosphated silicone polymers which have very low volatility. Volatility is a major concern in formulating fiber lubricants. This is due to the fact that fiber lubricants are exposed to high temperatures during processing. Volatile lubricants, like non-silicone based phosphate esters, evaporate from the fiber and go into the air. This results not only in loss of efficency and high costs, but potential enviromental contamination in the workplace. Still another object of the present invention is to provide a series of phosphated silicone polymers which have differing solubilities in water and organic solvents. This is achieved by selection of the hydroxy silicone polymer used as a raw material.

Application of the compounds of the invention can be from solvent, aqueous dispersion or solution, or applied neat in these processes.

The silicone polymers, suitable as raw materials, in a preferred embodiment, contain varying amounts of ethylene oxide, propylene oxide or butylene oxide or mixtures thereof. The presence of the oxide in the phosphated silicone polymer results in compounds with an inverse cloud point. Inverse cloud point phenomenon are well known to those skilled in the art of nonionic surface active agents. The inverse cloud point is defined as a temperature above which the polymer has minimal solubility in water. If heat is aplied to an aqueous solution of the nonionic at the inverse cloud point the material will become insoluble, and the solution will turn milky. It is at this point that the polymer has minimal water solubility. Since the product is no longer in solution at above this temperature, it is within this temperature range that the product has maximum substantivity to a fiber. The ability to use temperature to deposit a lubricant, antistat onto a fiber offers a great advantage in cost effectiveness of fiber treatment, and results in less product usage.

(3) Description of the Arts and Practices

Silicone oils (dimthylpolysiloxane) have been known to be active at the surface of plastic, cellulosic and synthetic fibers as well as paper. Despite the fact that they are lubricants that are stable to oxidation, their high cost and lack of durability has made them cost prohibitive in most application areas. Silicone oils need to be emulsified prior to application. This requires high pressure equipment, surface active agents and generally results in a milky emlsion. Emulsions have experienced stability problems both in terms of freeze thaw instability and upon heating. This has resulted in minimal acceptance of them in commercial products.

The low efficiency of silicone oils is due to the fact that the oil is very water insoluble. Emulsions are generally prepared which contain silicone dispersed in micelles. While this method of application is easier for processing, much of the oil stays in the surfactant micelle and never gets deposited on the fiber. That which does deposit on the fiber surface remains there by hydrophobic binding, not ionic bonding. Since the polydimethylsiloxane is not ionically bonded the effect is very transient. The product is removed with one washing.

Fatty alcohol phosphate esters have been known fiber lubricants for many years. They have a much lower molecular weight than the silicone based compounds of the present invention. For this reason, they are much more volatile and cannot be used in high temperature fiber applications. The standard fatty phosphate esters used in fiber lubricant formulations, are not as efficient as those based upon silicone polymers.

Many attempts have been made to overcome these problems and get a truly substantive non volatile product, which deposits on fiber efficiently. One approach has been to use hydrosilation technology to make alkoxylated silicone polymers, used as raw materials in this invention. These materials do not have the substantivity desired to make them suitable for use as fiber lubricants or antistats. It was not until the compounds of the present invention that the desirable lubrication and low volatility of silicone could be effectively used in a fiber lubricant system by incorporation of a phosphate group onto the polymer backbone U.S. Pat. No. 3,511,699 to Sterman issued May 12, 1970 teaches that epoxy compounds placed in the silicone backbone by hydrosilation can be cured onto certain fibers to give improved substantivity. The substantivity is based upon the reaction of hydroxyl groups on the cellulosic and the epoxy group in the silicone polymer. The resulting bond is a ether linkage and a new hydroxyl group. While a definite improvement over other compounds the efficiency and durability of the were not good enough to allow for cost effective incorporation of these materials in detergent formulations.

THE INVENTION (1) Summary of the Invention

The present invention relates to a series of novel phosphated silicone polymers. These polymers have a pendant phosphate functional group present. The polymers by virtue of the pendent group deposit on fiber surfaces and form effective nonvolatile surface modifying finishes. The compounds of the present invention are substantive to cellulosic and synthetic fibers.

The compounds of this invention having a pendant amino group is represented by the following formula;

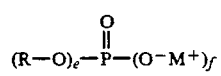

wherein
R is

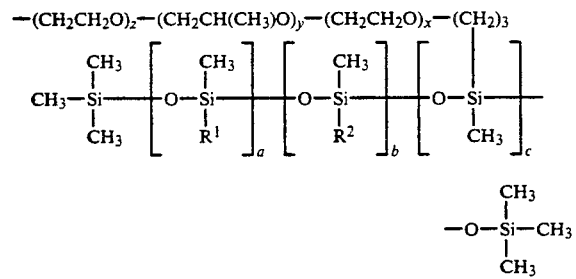

a is an integer from 0 to 200;
b is an integer from 0 to 200;
c is an integer from 1 to 200;
$R^1$ is selected from $-(CH_2)_nCH_3$ and phenyl;
n is an integer from 0 to 10;
$R^2$ is $-(CH_2)_3-(OCH_2CH_2)_x-(OCH_2CH(CH_3))_y-(OCH_2CH_2)_z-OH$;
x, y and z are integers and are independently selected from 0 to 20;
e and f range from 1 to 2 with the proviso that e+f=3;
M is selected from H, Na, K, Li or $NH_4$.

The products of the present invention are prepared by reaction of a hydroxyl containing silicone polymer with a suitable phosphating reagent.

One method of placing preparing the reactive hydroxyl containing silicone polymer is to react silanic hydrogen containing polymer with allyl alcohol or allyl alcohol alkoxylate monomer. Procedures this reaction are well known to those skilled in the art. U.S. Pat. No. 4,083,856 describe suitable processes.

EXAMPLES

Vinyl Intermediate Compounds

Compounds of this class are prepared by alkoxylation of allyl alcohol using methods well known to those skilled in the art. The following are some of the many compounds which can be used to make the products of this invention.

| $CH_2=CH-CH_2-O-(CH_2-CH_2-O)_x-(CH_2-CH(CH_3)-O)_y-(CH_2-CH_2-O)_z-H$ | | | | |
|---|---|---|---|---|
| Designation | x | y | z | Molecular Weight |
| A | 3 | 0 | 0 | 189 |
| B | 9 | 27 | 3 | 2,178 |
| C | 11 | 3 | 0 | 718 |
| D | 0 | 0 | 0 | 57 |
| E | 20 | 20 | 20 | 2,940 |
| F | 20 | 0 | 0 | 880 |
| G | 10 | 10 | 10 | 1,470 |

Preparation of Intermediates

Silicone intermediates of the type used to make the compounds of this invention are well known to those skilled in the art. International Publication (*Silicone Alkylene Oxide Copolymers As Foam Control Agents*) WO 86/0541 by Paul Austin (Sept. 25, 1986) p.16 (examples 1 to 6) teaches how to make the following intermediates, and is incorporated herein by reference.

Hydrosilation of Intermediates

Silanic Hydrogen Containing Compounds $$CH_3-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{H}{|}}{\overset{\overset{CH_3}{|}}{Si}}-O-\underset{\underset{CH_3}{|}}{\overset{\overset{CH_3}{|}}{Si}}-CH_3$$

| M | D | D' | M |

Group Designations
Phosphated Silicone Polymers

| Example | Austin Example | Group Designation | Average Molecular Weight | Equivalent Molecular Weight |
|---|---|---|---|---|
| 1 | 1 | $MD_{20} D'_{3.2} M$ | 1,850 | 551 |
| 2 | 4 | $MD_{160} D'_5 M$ | 24,158 | 4.831 |
| 3 | 6 | $MD_{20} D'_{10} M$ | 2,258 | 225 |

Hydrosilation Compounds

The hydrosilation reaction used to make the compounds of this invention are well known to those skilled in the art. Reference; International Publication (*Silicone Alkylene Oxide Copolymers As Foam Control Agents*) WO 86/0541 by Paul Austin (Sept. 25, 1986) p. 19.

Example 4

To a 22 liter three necked round bottom flask fitted with a mechanical agitator, thermometer with a Thermo-watch temperature regulator, nitrogen sparge tube vented reflux condenser and heating mantle is added 189.0 grams of Vinyl Intermediate Example #A. Next add 225 grams of Silanic Hydrogen Containing Compound Example #3 and 3,000 grams of toluene. Heat to 115 C. to remove azeotropically remove any water and 200 ml of toluene. The temperature is reduced to 85 C. and 3.5 ml of 3% $H_2PtCl_6$ in ethanol is added. Light to then excluded from the flask by covering it with a black cloth. An exotherm is noted to about 95 C., while the contents are stirred for about 2 hours. During this time silanic hydrogen concentration drops to nil. Cool to 65 C. and slowly add 60 g of sodium bicarbonate. allow to mix overnight and filter through a 4 micron pad. Distill off any toluene at 100 C. and 1 torr.

Example 5-10

The above procedure is repeated, only this time replacing both the silanic hydrogen compound #3 with the specified number of grams of the specified silanic hydrogen compound and the vinyl intermediate example A with the specified number of grams of the specified vinyl intermediate.

| | Vinyl Intermediate | | Silanic Hydrogen Compound | |
|---------|---------|---------|---------|---------|
| Example | Example | Grams | Example | Grams |
| 4 | A | 189.0 | 1 | 551.0 |
| 5 | B | 2,178.0 | 2 | 4,831.0 |
| 6 | C | 718.0 | 3 | 225.0 |
| 7 | D | 57.0 | 1 | 551.0 |
| 8 | E | 2,940.0 | 2 | 4,831.0 |
| 9 | F | 880.0 | 3 | 225.0 |
| 10 | G | 1,470.0 | 1 | 551.0 |

Phosphation

Phosphating Agents

Polyphosphoric Acid (PPA) is 115% phosphoric acid. When used as a phosphating agent it gives more mono ester than the phosphorus pentoxide.

Phosphorus pentoxide is $P_2O_5$. It is more aggressive in phosphation and results in more diester.

The silicone phosphates of this invention can be prepared by reacting the hydroxyl containing silicone polymer with a suitable phosphating agent. Preferred phosphating reagents are polyphosphoric acid and phosphorus pentoxide.

The preparation of the novel silicone phosphates of this invention from the hydroxy silicone compounds can be illustrated by the following reaction in which R is the hydroxy silicone compound.

Phosphation Reaction Sequence $$R-OH + P_2O_5 \longrightarrow$$

$$(R-O)-P(O)-(OH)_2 \text{ and } (R-O-)_2P(O)-(OH)$$

$$\downarrow \text{Neutralization KOH/Water}$$

$$(R-O)-P(O)-(OK)_2 \text{ and } (R-O-)_2P(O)-(OK)$$

It will be understood by the above reaction that the product of phosphation, weather using polyphosphoric acid or phosphorus pentoxide give a mixture of mono and di ester.

The following examples further illustrate the objects and advantages of this invention, though it should be understood that the various reactants and amounts thereof, reaction conditions, and other details are merely illustrative and should not be construed to unduly limit this invention.

GENERAL PROCEDURE

The specified amount of hydroxy silicone compound (Examples 4-10) is added to a suitable reaction vessel. The specified amount of either polyphosphoric acid or phosphorus pentoxide is charged to under good agitation over a 2 hr. period. The exothermic reaction raises the temperature of the mixture to about 70 C. After 1 hour slowly raise the temperature to 100 C. and hold 2-4 hours.

| | Hydroxy Silicone | | Polyphosphoric Acid |
|---------|---------|---------|---------|
| Example | Example | Grams | Grams |
| 11 | 4 | 740.0 | 56.5 |
| 12 | 5 | 7009.0 | 56.5 |
| 13 | 6 | 943.0 | 56.5 |
| 14 | 7 | 608.0 | 56.5 |
| 15 | 8 | 7771.0 | 56.5 |
| 16 | 9 | 1105.0 | 56.5 |
| 17 | 10 | 2021.0 | 56.5 |

Phosphorus Pentoxide

| | Hydroxy Silicone | | Phosphorus Pentoxide |
|---------|---------|---------|---------|
| Example | Example | Grams | Grams |
| 18 | 11 | 798.0 | 36.0 |
| 19 | 12 | 7067.0 | 36.0 |
| 20 | 13 | 1001.0 | 36.0 |
| 21 | 14 | 666.0 | 36.0 |
| 22 | 15 | 7829.0 | 36.0 |
| 23 | 16 | 1163.0 | 36.0 |
| 24 | 17 | 2079.0 | 36.0 |

The compounds of examples 11–24 are neutralized to pH 7 with 20% aqueous base. The following bases are used; NaOH, KOH, LiOH, NH4OH.

| Example | Phosphated Silicone Example | Base Type |
|---------|---------|---------|
| 25 | 11 | KOH |
| 26 | 12 | NaOH |
| 27 | 13 | LiOH |
| 28 | 14 | NH4OH |
| 29 | 15 | KOH |
| 30 | 16 | NaOH |
| 31 | 17 | KOH |
| 32 | 19 | NaOH |
| 33 | 19 | KOH |
| 34 | 20 | NaOH |
| 35 | 21 | KOH |
| 36 | 22 | NaOH |
| 37 | 23 | KOH |
| 38 | 24 | NaOH |

Applications Evaluation

Lubrication

Frictional Properties

| FRICTIONAL PROPERTIES | | | |
|---------|---------|---------|---------|
| | | LUBRICATION DATA[1] | |
| | | Coefficient of Friction FIBER/METAL | |
| | DESCRIPTION | 100 | 300 |
| PRODUCT | (70 F.) | (m/min.) | |
| Butyl Stearate | White Liquid | 0.17 | 0.21 |
| Tridecyl Stearate | Clear Liquid | 0.25 | 0.27 |
| Example 26 | Clear Liquid | 0.09 | 0.16 |
| Example 32 | Clear Liquid | 0.10 | 0.18 |
| TMP Trioleate | Clear Amber Liquid | 0.25 | 0.35 |
| Ditridecyl adipate | Clear Amber Liquid | 0.28 | 0.29 |

[1]Rothchild F Meter, Fiber; 150 denier polyester, Temperature; 72 F., Relative humidity; 60%

Alkali Stability

The compounds of the present invention were also found to have excellent stability in alkaline environments while the hydroxy materials were degraded in 10% sodium hydroxide.

| Example | Type | Stability 1% in 10% NaOH |
|---------|-----------|--------------------------|
| 5       | Hydroxyl  | Split in one day         |
| 7       | Hydroxyl  | Split in one day         |
| 9       | Hydroxyl  | Split in one day         |
| 31      | Phosphate | Stable over 1 month      |
| 32      | Phosphate | Stable over 1 month      |
| 38      | Phosphate | Stable over 1 month      |

What is claimed is:

1. A phosphated silicone polymer which conforms to the following structure;

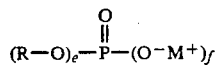

wherein;

R is

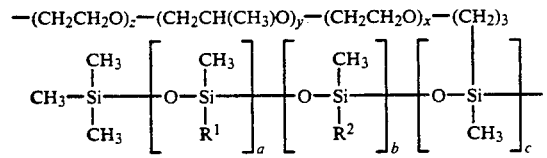

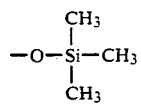

$a$ is an integer from 0 to 200;
$b$ is an integer from 0 to 200;
$c$ is an integer from 1 to 200;
$R^1$ is selected from $-(CH_2)_nCH_3$ and phenyl;
$n$ is an integer from 0 to 10;
$R^2$ is $-(CH_2)_3-(OCH_2CH_2)x-(OCH_2CH(CH_3))y-(OCH_2CH_2)z-OH$;
$x$, $y$ and $z$ are integers and are independently selected from 0 to 20;
$e$ and $f$ range from 1 to 2 with the proviso that $e+f=3$;
M is selected from H, Na, K, Li or $NH_4$.

2. A compound of claim 1 wherein c is an integer from 1 to 20.
3. A compound of claim 1 wherein $R^1$ is $-CH_3$.
4. A compound of claim 1 wherein $R^1$ is phenyl.
5. A compound of claim 1 wherein n is 7.
6. A compound of claim 1 wherein x, y and z are each 0.
7. A compound of claim 1 wherein x+y+z is an integer ranging from 1 to 5.
8. A compound of claim 1 wherein a is 0.
9. A compound of claim 1 wherein a is 20.
10. A compound of claim 1 wherein a is 200.
11. A compound of claim 1 wherein b is 0.
12. A compound of claim 1 wherein b is 20.
13. A compound of claim 1 wherein b is 200.
14. A compound of claim 1 wherein c is 1.
15. A compound of claim 1 wherein c is 2.
16. A compound of claim 1 wherein c is 200.
17. A compound of claim 1 wherein c is 10.
18. A compound of claim 1 wherein c is 50.
19. A compound of claim 1 wherein c is 100.

* * * * *